US011055294B2

(12) United States Patent
Matsuda

(10) Patent No.: US 11,055,294 B2
(45) Date of Patent: Jul. 6, 2021

(54) COMMUNICATION TERMINAL, CONTENT SERVER, CONTENT RECOMMENDATION SYSTEM, CONTROL DEVICE, AND CONTROL METHOD

(71) Applicant: SHARP KABUSHIKI KAISHA, Sakai (JP)

(72) Inventor: Yozo Matsuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 227 days.

(21) Appl. No.: 16/459,422

(22) Filed: Jul. 1, 2019

(65) Prior Publication Data

US 2020/0012651 A1 Jan. 9, 2020

(30) Foreign Application Priority Data

Jul. 4, 2018 (JP) ............................ JP2018-127756

(51) Int. Cl.

| | |
|---|---|
| G06F 16/22 | (2019.01) |
| G06F 16/2457 | (2019.01) |
| G06F 16/248 | (2019.01) |
| G06F 3/0484 | (2013.01) |

(52) U.S. Cl.

CPC .... G06F 16/24575 (2019.01); G06F 16/2291 (2019.01); G06F 16/248 (2019.01); G06F 3/04847 (2013.01)

(58) Field of Classification Search

CPC ........... G06F 16/24575; G06F 16/2291; G06F 16/248; G06F 3/04847; G06F 16/435; G06F 16/9535

See application file for complete search history.

(56) References Cited

U.S. PATENT DOCUMENTS

| | | | | |
|---|---|---|---|---|
| 9,712,587 | B1 * | 7/2017 | Alfishawi | A61B 5/165 |
| 10,049,663 | B2 * | 8/2018 | Orr | G10L 25/84 |
| 10,481,749 | B1 * | 11/2019 | Alfishawi | A61B 5/11 |
| 2011/0134026 | A1 * | 6/2011 | Kang | G10L 17/26 345/156 |
| 2013/0283303 | A1 * | 10/2013 | Moon | G06Q 30/0631 725/10 |
| 2014/0223462 | A1 * | 8/2014 | Aimone | G16H 40/67 725/10 |
| 2018/0285463 | A1 * | 10/2018 | Choi | G06F 16/9535 |

FOREIGN PATENT DOCUMENTS

JP 2005-141281 A 6/2005

* cited by examiner

*Primary Examiner* — Jorge A Casanova
(74) *Attorney, Agent, or Firm* — ScienBiziP, P.C.

(57) ABSTRACT

In a communication terminal including a playback device, an input device, a communication device, and a control device, the control device performs content presentation processing of acquiring a content from a content server and displaying the content, emotion data storage processing of storing, in the content server, at least a piece of emotion data of a user of the communication terminal, which is input in accordance with the content, tendency specification processing of acquiring the emotion data, which has been stored, from the content server, and specifying a tendency of a change over time on the basis of the emotion data, and recommendation content search processing of searching for a recommendation content to be recommended to the user on a basis of the emotion data and the tendency.

9 Claims, 8 Drawing Sheets

| CONTENT ID | GENRE | CONTENT |
|---|---|---|
| 1 | ACTION | Content1.mp4 |
| 2 | COMEDY | Content2.mp4 |
| 3 | HORROR | Content3.mp4 |
| 4 | DOCUMENTARY | Content4.mp4 |
| 5 | OTHERS | Content5.mp4 |

(b)

232

| USER ID | CONTENT ID | ELAPSED TIME | EMOTION DATA | | | |
|---|---|---|---|---|---|---|
| | | | DELIGHT | ANGER | SORROW | PLEASURE |
| A | 1 | 00:00:00 | 0 | 9 | 4 | 0 |
| A | 1 | 00:00:10 | 0 | 8 | 9 | 0 |
| A | 1 | 00:00:20 | 0 | 6 | 0 | 0 |
| B | 2 | 00:00:00 | 0 | 8 | 3 | 0 |
| B | 2 | 00:00:10 | 0 | 7 | 8 | 0 |
| C | 3 | 00:00:00 | 0 | 0 | 0 | 0 |

COMMUNICATION TERMINAL, CONTENT SERVER, CONTENT RECOMMENDATION SYSTEM, CONTROL DEVICE, AND CONTROL METHOD

BACKGROUND

1. Field

The present disclosure relates to a communication terminal or the like that recommends a content to a user.

2. Description of the Related Art

A system that acquires a content from a server and presents the content to a user has been known as a related art. A system that searches for a content meeting a demand or the like of a user has been also known. For example, Japanese Unexamined Patent Application Publication No. 2005-141281 discloses a content search system that searches for a content by using user information in which sense data of a user who is a viewer of a content is associated with the content.

However, the related art as described above enables searching for the content by using the sense data of the user, but has a problem that it is difficult to search for the content on the basis of a change over time in a level of an emotion of the user.

An aspect of the disclosure is made in view of the aforementioned problem and provides a communication terminal or the like that recommends an appropriate content on the basis of a change over time in a level of an emotion of a user.

SUMMARY

In order to cope with the aforementioned problem, a communication terminal according to an aspect of the disclosure is a communication terminal including at least one playback device, at least one input device, at least one communication device, and at least one control device, in which the control device performs content presentation processing of acquiring a content from a content server via the communication device and playing back the content by the playback device, emotion data storage processing of storing, in the content server via the communication device, at least a piece of emotion data that is input from the input device and that is a change over time in a level of an emotion of a user of the communication terminal, which is caused by viewing the content played back by the playback device, tendency specification processing of acquiring the emotion data of the user, which has been stored in the content server, from the content server via the communication device and specifying a tendency of the change over time of the user on a basis of the emotion data, and recommendation content search processing of searching for a recommendation content to be recommended to the user on a basis of the emotion data and the tendency.

A content server according to an aspect of the disclosure is a content server including at least one storage device and at least one control device, in which the control device performs content presentation processing of providing a content to a communication terminal, emotion data storage processing of receiving, from the communication terminal, at least a piece of emotion data that is input by a user of the communication terminal and that is a change over time in a level of an emotion, which is caused when the user views the content, and storing the emotion data in the storage device, tendency specification processing of specifying a tendency of the change over time of the user on a basis of the emotion data of the user, which has been stored in the storage device, and recommendation content search processing of searching the storage device for a recommendation content to be recommended to the user on a basis of the tendency.

A control method according to an aspect of the disclosure is a control method of a communication terminal including at least one playback device, at least one input device, at least one communication device, and at least one control device, and the control method includes: acquiring a content from a content server via the communication device and playing back the content by the playback device; storing, in the content server via the communication device, at least a piece of emotion data that is input from the input device and that is a change over time in a level of an emotion of a user of the communication terminal, which is caused by viewing the content played back by the playback device; acquiring the emotion data of the user, which has been stored in the content server, from the content server via the communication device and specifying a tendency of the change over time of the user on a basis of the emotion data; and searching for a recommendation content to be recommended to the user on a basis of the emotion data and the tendency.

A control device according to an aspect of the disclosure is a control device that controls a communication terminal, and the control device includes: a content presentation unit that acquires a content from a content server via a communication device and plays back the content by a playback device; an emotion data accumulation unit that stores, in the content server via the communication device, at least a piece of emotion data that is a change over time in a level of an emotion of a user of the communication terminal, which is caused by viewing the content played back by the playback device; a tendency specification unit that acquires the emotion data of the user, which has been stored in the content server, from the content server via the communication device and specifies a tendency of the change over time of the user on a basis of the emotion data; and a recommendation content search unit that searches for a recommendation content to be recommended to the user on a basis of the emotion data and the tendency.

Advantageous Effects of Invention

An aspect of the disclosure advantageously provides a communication terminal or the like that recommends an appropriate content on the basis of a change over time in a level of an emotion of a user.

Figure 2:
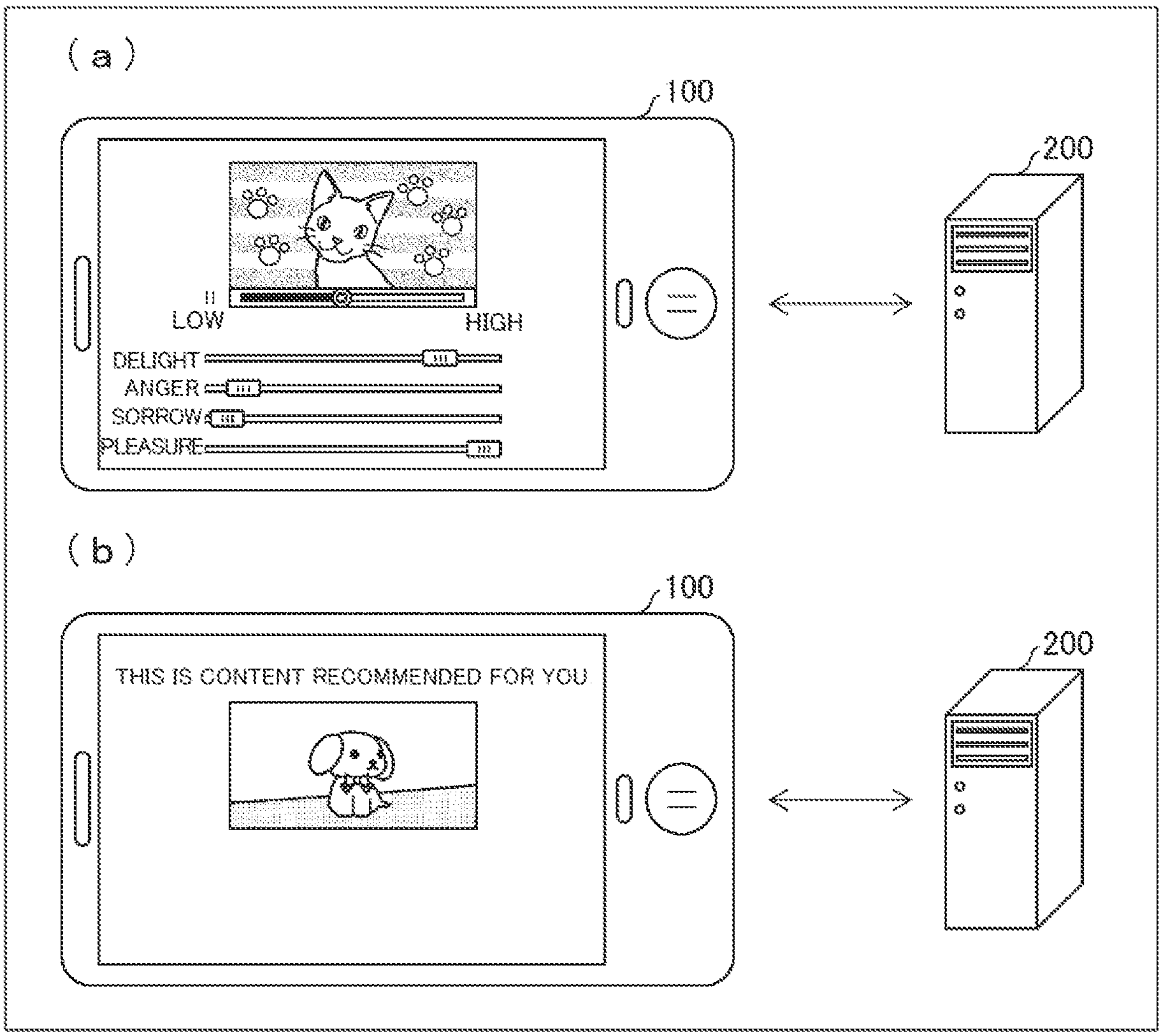
Figure 3:
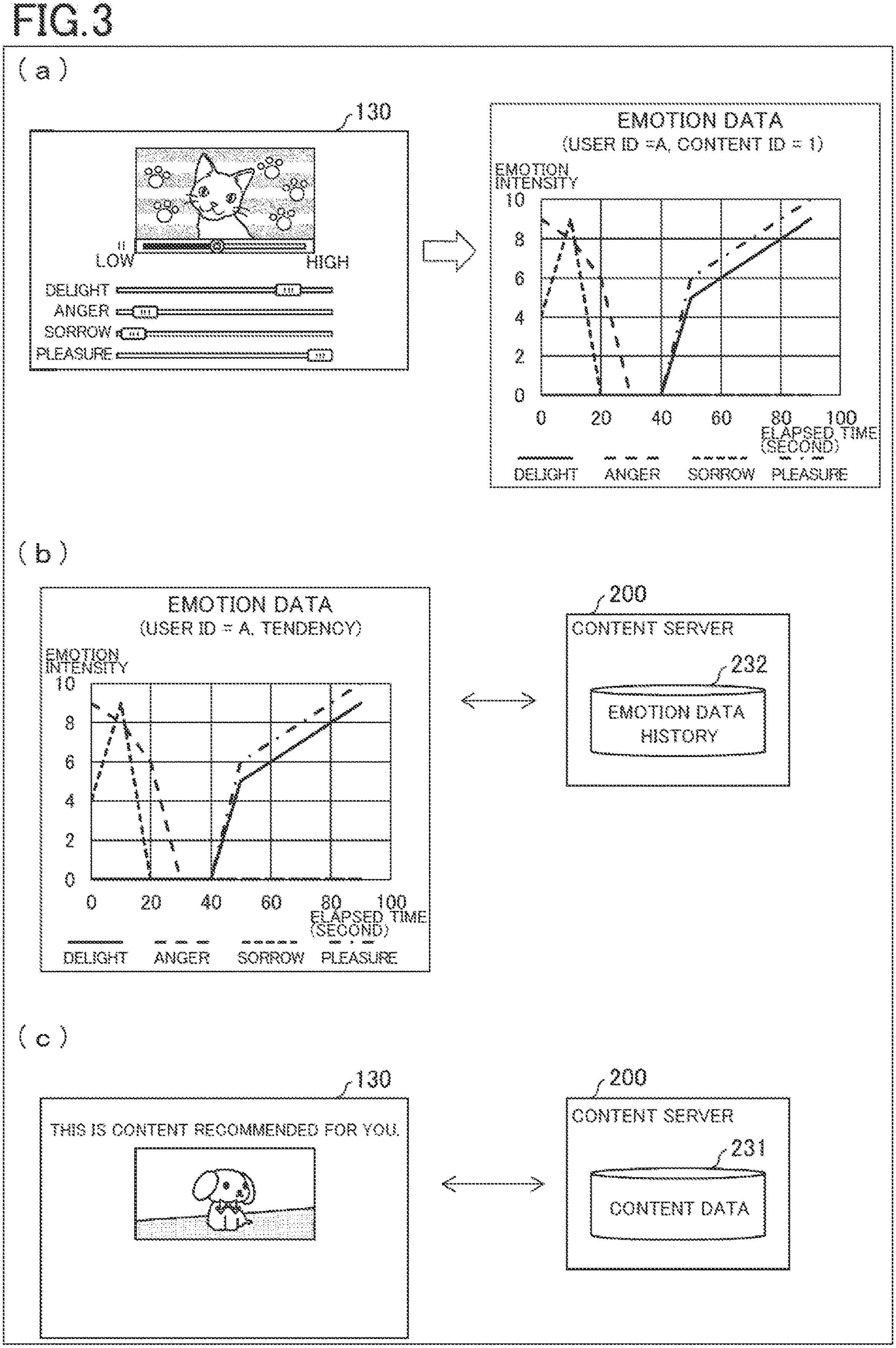
Figure 5:
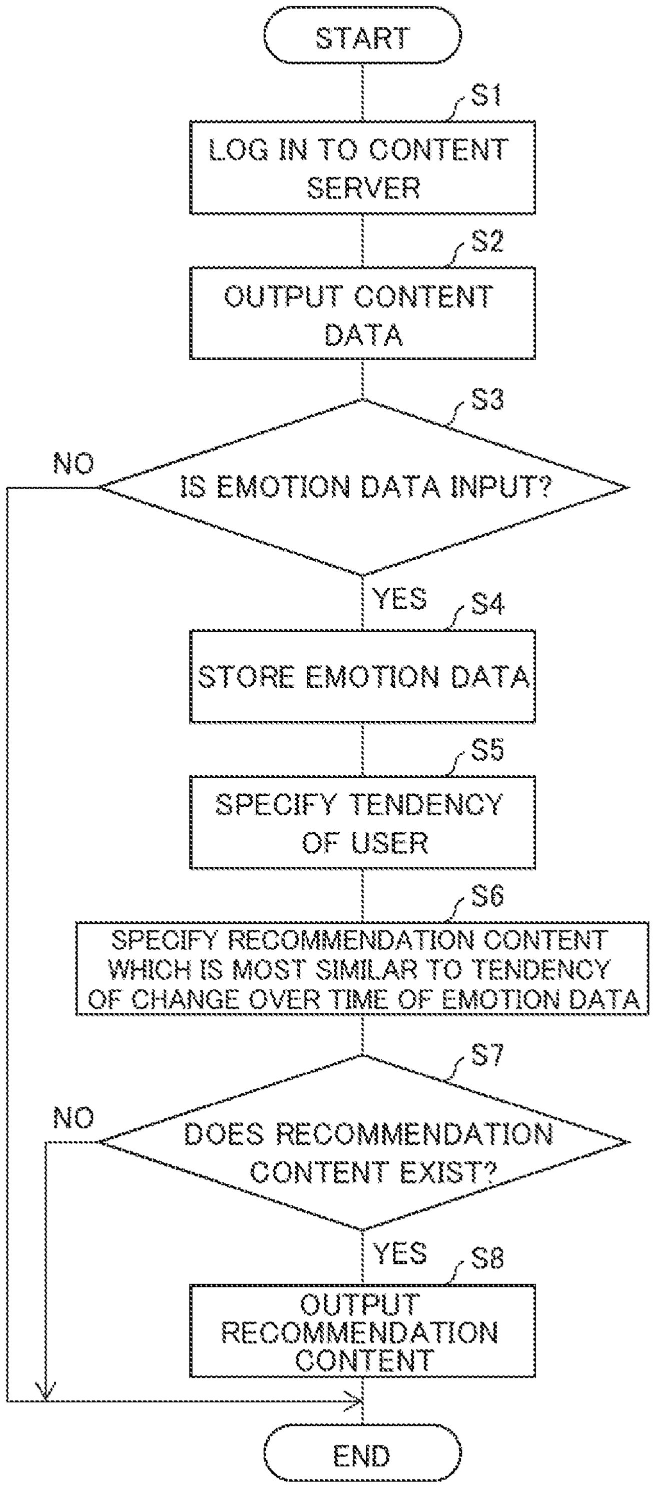
Figure 6:
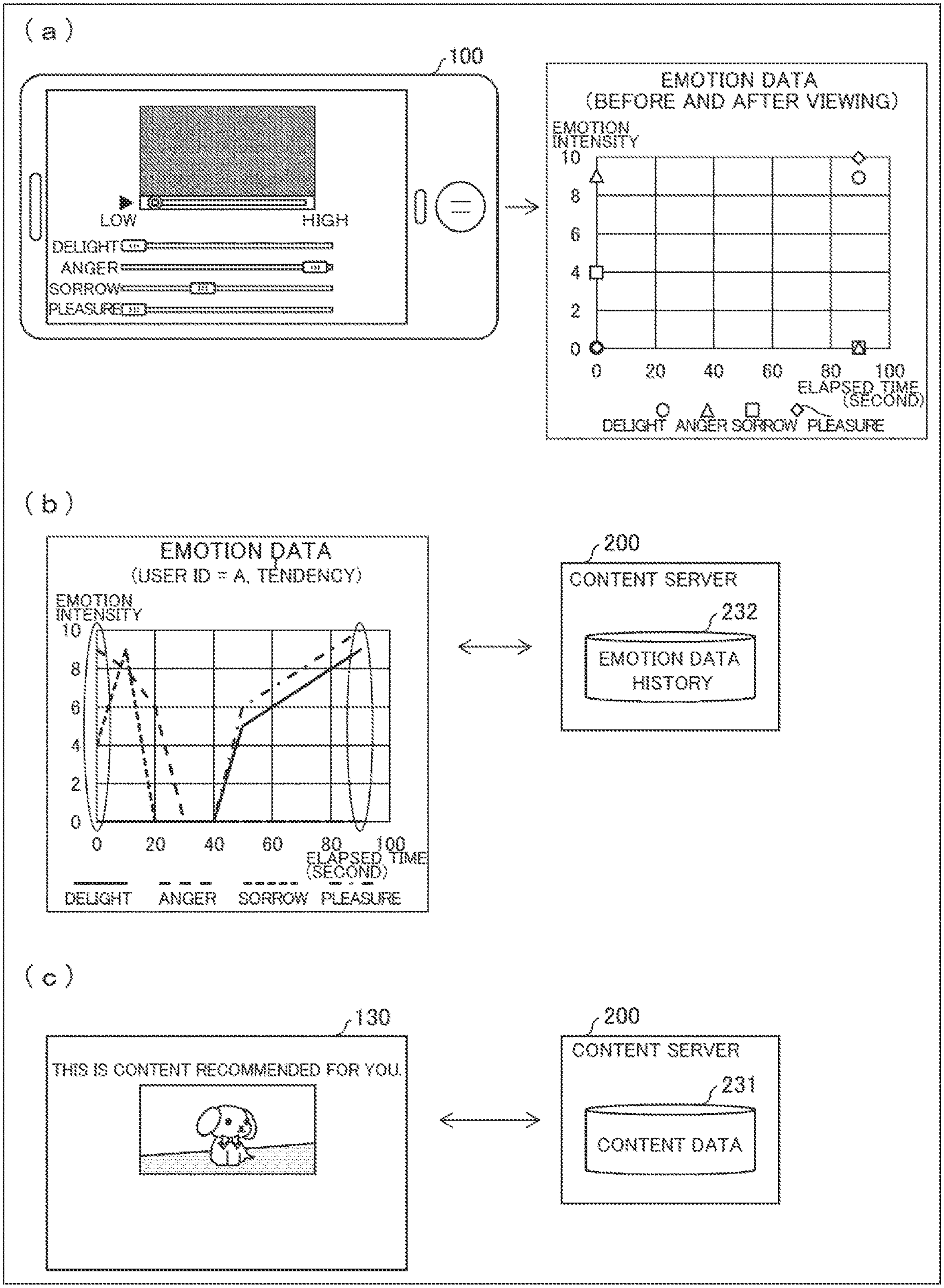
Figure 7:
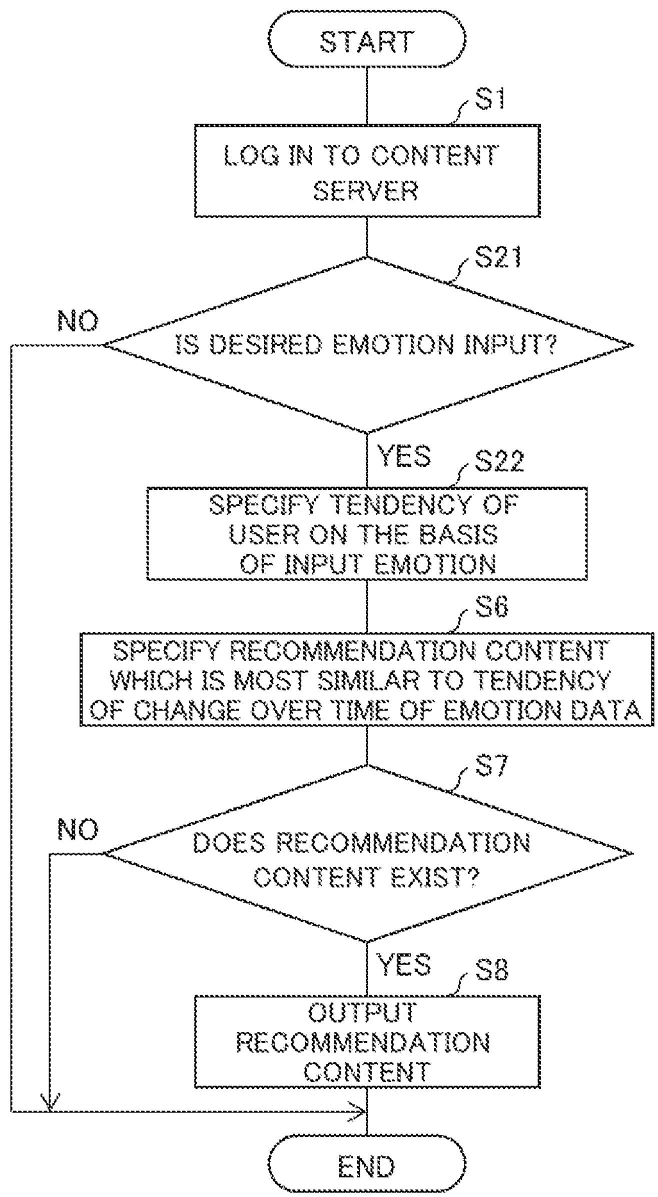
Figure 8:
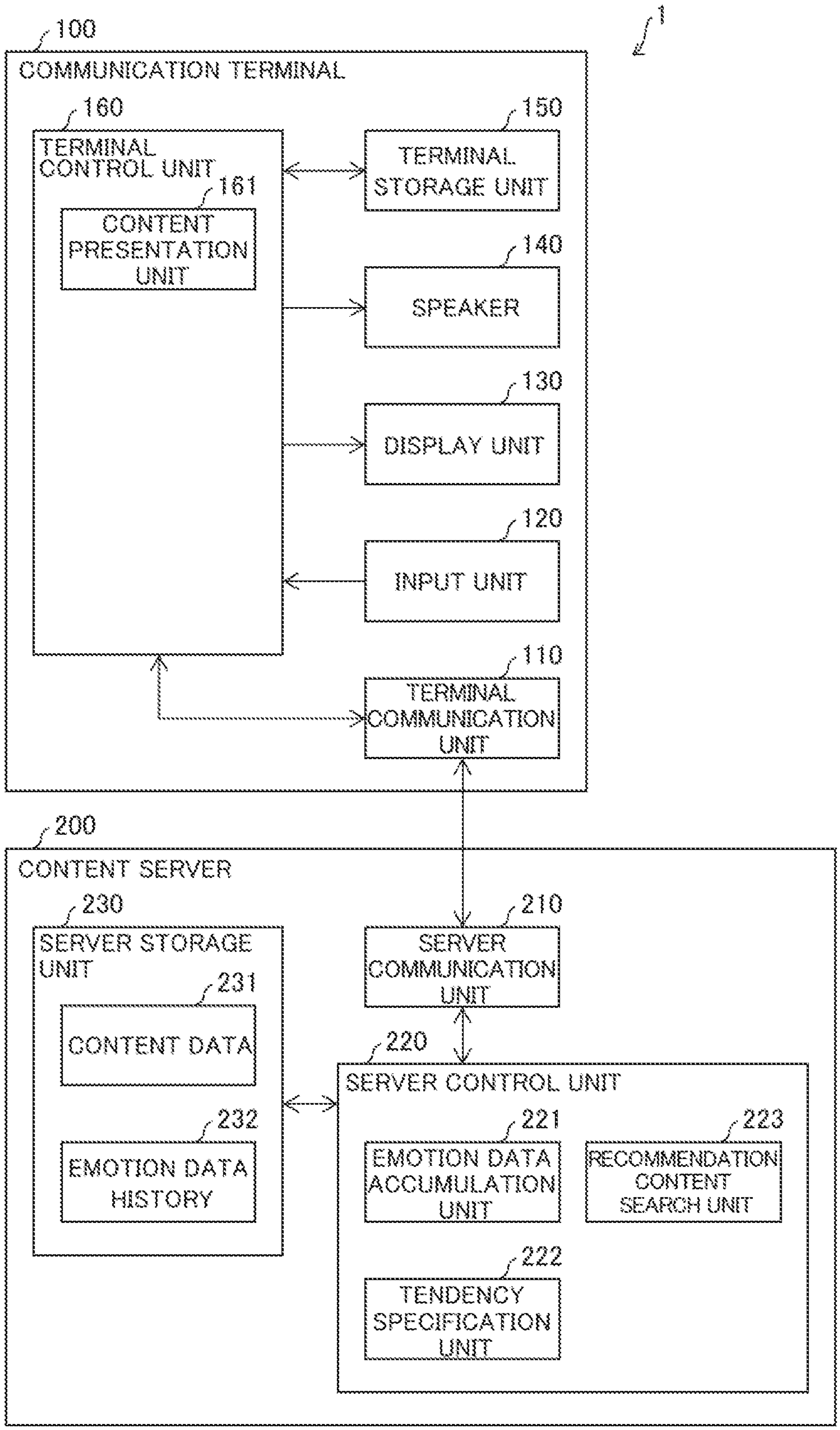

Portions (a) and (b) of FIG. 2 are schematic views each illustrating an example of a flow in which recommendation of a content is received by using the content recommendation system according to Embodiment 1 of the disclosure, in which (a) of FIG. 2 illustrates a flow in which emotion data is input while a content is played back in a communication terminal, and transmitted to a content server and (b) of FIG. 2 illustrates a flow in which a recommendation content that is searched on the basis of a history of the emotion data is output by the communication terminal;

Portions (a) to (c) of FIG. 3 are schematic views each illustrating an example of a flow in which a recommendation content is searched on the basis of an emotion data history accumulated in the content server in the content recommendation system according to Embodiment 1 of the disclosure, in which (a) of FIG. 3 illustrates a flow in which the emotion data is input while a content is viewed in the communication terminal, (b) of FIG. 3 illustrates a flow in which an emotion data history which is similar to the emotion data input in (a) of FIG. 3 is searched, and (c) of FIG. 3 illustrates a flow in which a recommendation content is decided on the basis of a result of the search in (b) of FIG. 3, and output by the communication terminal;

Portions (a) and (b) of FIG. 4 each illustrate a specific example of data stored in the content server according to Embodiment 1 of the disclosure, in which (a) of FIG. 4 illustrates an example of content data and (b) of FIG. 4 illustrates an example of an emotion data history;

FIG. 5 is a flowchart illustrating an example of a flow of processing performed by the communication terminal in the content recommendation system according to Embodiment 1 of the disclosure;

Portions (a) to (c) of FIG. 6 are schematic views each illustrating a flow in which a tendency of a change over time in a level of an emotion of the user is specified on the basis of a current emotion of the user and his or her desired emotion after viewing of content data in a content recommendation system according to Embodiment 2 of the disclosure, in which (a) of FIG. 6 illustrates a situation in which the user of the communication terminal inputs his or her current emotion and his or her desired emotion after viewing of content data, (b) of FIG. 6 illustrates a flow in which a tendency of the change over time in the level of the emotion of the user is specified on the basis of contents that are input in (a) of FIG. 6, and (c) of FIG. 6 illustrates a flow in which a recommendation content is specified on the basis of the tendency specified in (b) of FIG. 6, and is output by the communication terminal;

FIG. 7 is a flowchart illustrating a flow of processing performed by a communication terminal according to Embodiment 2 of the disclosure; and FIG. 8 is a block diagram illustrating an example of a configuration of a principal part of a content recommendation system according to a modified example of the disclosure.

DESCRIPTION OF THE EMBODIMENTS

Embodiment 1

An embodiment of the disclosure will be described in detail below with reference to FIGS. 1 to 5.

(Outline of Content Recommendation System)

An outline of a content recommendation system 1 according to the present embodiment will be described with reference to (a) and (b) of FIG. 2. Portions (a) and (b) of FIG. 2 are schematic views each illustrating an example of a flow in which recommendation of a content is received by using the content recommendation system 1. Portion (a) of FIG. 2 illustrates a flow in which a user inputs a change over time in a level of his or her emotion while a content is presented in a communication terminal 100, and transmits the change over time to a content server 200. Portion (b) of FIG. 2 illustrates a flow in which the communication terminal 100 outputs a recommendation content that is searched on the basis of a history of emotion data.

The content recommendation system 1 is a system that recommends a new content to a user who views a content on the basis of a change over time in a level of an emotion of the user. The content recommendation system 1 includes the communication terminal 100 used by the user to view a content and the content server 200 that stores a plurality of pieces of content data and is able to provide the communication terminal 100 with a content. Note that, though a case where content data is moving image data will be described in the following description, the content data may be still image data or sound data.

Portion (a) of FIG. 2 illustrates a state where the communication terminal 100 receives content data from the content server 200 and displays the content data. In an example illustrated in the figure, the communication terminal 100 receives specific content data from the content server 200 in accordance with an operation of the user and displays the content data.

At this time, the communication terminal 100 allows the user to input, with respect to the content data, his or her emotion while viewing a content. In the example illustrated in the figure, input fields corresponding to respective four emotions of "delight", "anger", "sorrow", and "pleasure" are provided below the content.

In the example illustrated in the figure, each of the input fields is realized as a UI resembling a slider. In the input field, high and low are defined along a horizontal direction, and when the user inputs a change of his or her emotion to the input field in accordance with a change over time in the content data, the user is able to register the change over time in the level of his or her emotion by linking the change over time to the content data. An input in the UI resembling the slider illustrated in the figure is, for example, a sliding operation in the horizontal direction in a state where a knob portion of the UI is touched. For example, the user performs the input to the input field so that "sorrow" is highest while a sorrow scene is displayed in the communication terminal 100 and performs the input to the input field so that "delight" or "pleasure" is highest while a happy ending scene is displayed.

The content server 200 is able to store information about changes over time in a level of an emotion, which are input by a plurality of users. That is, the content server 200 stores a plurality of pieces of content data and information about the changes over time in the level of the emotion, which are registered to be linked with the respective pieces of content data and input by the plurality of users.

Portion (b) of FIG. 2 illustrates a state where the communication terminal 100 recommends content data including a picture of a dog as a new content for the user who views content data including a picture of a cat in (a) of FIG. 2. In an example illustrated in the figure, on the basis of the information which is accumulated in the content server 200 and relates to the changes over time in the level of the emotion that are input by the plurality of users, the communication terminal 100 searches for a recommendation content to be recommended to the user of the communication terminal 100 from among content data. Then, the communication terminal 100 displays, as the recommendation content, a content (i.e. content including the picture of the dog) which is a result of the search. Note that, the communication terminal 100 may display content data itself of the recommendation content or one which is simplified like a thumbnail image.

Though a specific method of searching for a recommendation content will be described later with reference to (a) to (c) of FIG. 3, it is desirable that at least information about the emotion input by the user in the past is used so that a content according to a tendency of the content viewed by the user is extracted.

In this manner, the content recommendation system 1 according to the present embodiment is able to recommend a new content to the user as a recommendation content on the basis of the change over time in the level of his or her emotion, which is input by the user.

(Configuration of Content Recommendation System)

Figure 1:
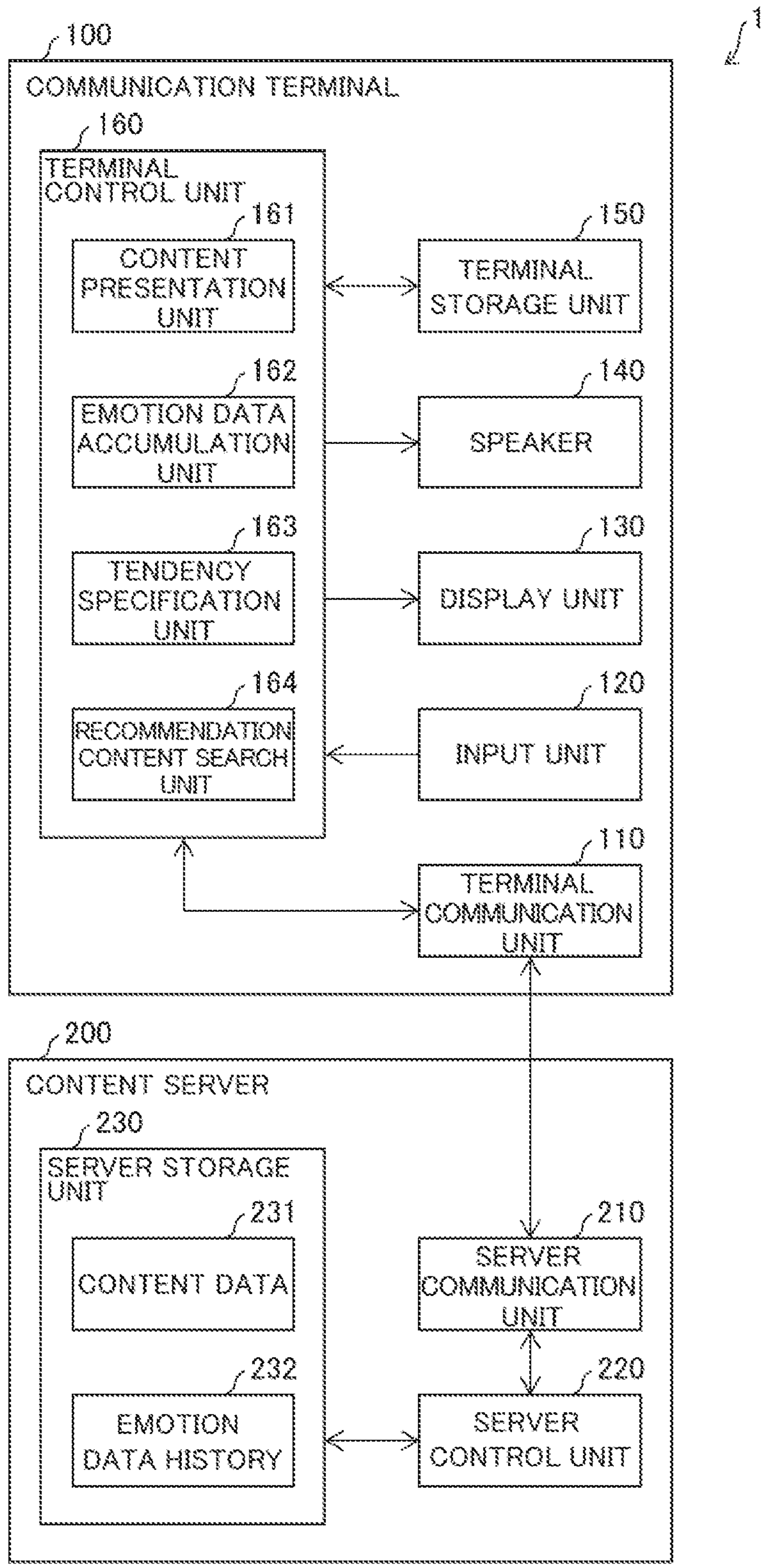
FIG. 1 is a block diagram illustrating an example of a configuration of a principal part of a content recommendation system according to Embodiment 1 of the disclosure.

A configuration of the content recommendation system according to the present embodiment will be described with reference to FIG. 1. FIG. 1 is a block diagram illustrating an example of a configuration of a principal part of the content recommendation system 1.

The content recommendation system 1 includes the communication terminal 100 and the content server 200. Note that, a plurality of communication terminals 100 may be provided. The communication terminal 100 includes a terminal communication unit 110, an input unit 120, a display unit 130, a speaker 140, a terminal storage unit 150, and a terminal control unit 160. Further, the terminal control unit 160 includes a content presentation unit 161, an emotion data accumulation unit 162, a tendency specification unit 163, and a recommendation content search unit 164. The content server 200 includes a server communication unit 210, a server control unit 220, and a server storage unit 230, and the server storage unit 230 includes content data 231 and an emotion data history 232.

The communication terminal 100 is, for example, a smartphone that is able to communicates with the content server 200, receive content data from the content server 200, and present the content data to the user. The terminal communication unit 110 functions as a communication device that communicates with the server communication unit 210 and transmits and receives various kinds of information. The communication terminal 100 transmits and receives information to and from the content server 200 via the terminal communication unit 110. For example, the terminal communication unit 110 is able to receive the content data 231 and transmit emotion data each via the server communication unit 210. Here, the emotion data is data obtained by inputting the change over time in the level of the emotion while the user views a content. More specifically, the emotion data is data input by the user of the communication terminal 100 with use of the input unit 120 in accordance with the change over time in the level of the emotion, which is caused when the user views a content displayed on the display unit 130.

The input unit 120 functions as an input device that, upon receiving various inputs of the user to the communication terminal 100, transmits input contents to the terminal control unit 160. The input unit 120 may be any one as long as having a configuration that allows the user to input emotion data, and may be, for example, a touch panel integrally formed with the display unit 130 or a physical button or the like. The number of input units 120 may be single or multiple.

The display unit 130 is, for example, a display that functions as a playback device that plays back various kinds of information to the user as an image or a video in accordance with an instruction from the terminal control unit 160. When the content data received from the content server 200 includes an image or a video, the display unit 130 is able to play back the image or the video. The number of display units 130 may be single or multiple.

The speaker 140 functions as a playback device that plays back various kinds of information to the user as sound in accordance with an instruction from the terminal control unit 160. In a case where the content data received from the content server 200 includes sound, for example, the speaker 140 is able to play back the sound.

The terminal storage unit 150 functions as a storage device that stores various kinds of information handled by the communication terminal 100, and the various kinds of information are read and written by the terminal control unit 160. The terminal storage unit 150 may store, for example, information (such as an address of a connection destination or authentication information) used to perform communication with the content server 200.

The terminal control unit 160 functions as a control device that controls the respective units of the communication terminal 100 in an integral manner. The terminal control unit 160 gives an instruction to each of the units on the basis of input contents received by the input unit 120. The terminal control unit 160 instructs the content presentation unit 161 to present the content data received from the content server 200 to the user by using the display unit 130 and the speaker 140. The number of terminal control units 160 may be single or multiple.

The content presentation unit 161 executes content presentation processing of acquiring content data from the content server 200 via the terminal communication unit 110 in accordance with an instruction of the terminal control unit 160 and presenting (playing back) the content data to the user by using the display unit 130 and the speaker 140.

The emotion data accumulation unit 162 stores emotion data of the user, which is received by the input unit 120 while the content presentation unit 161 presents the content data to the user by using the display unit 130 and the speaker 140, in the emotion data history 232 of the content server 200. More specifically, the emotion data accumulation unit 162 executes emotion data storage processing indicated below. That is, the emotion data accumulation unit 162 transmits, to the content server 200 via the terminal communication unit 110, the emotion data input by the user by linking the emotion data to the content data presented by the content presentation unit 161 at a time of the input. Then, the emotion data accumulation unit 162 stores (additionally registers) the emotion data in the emotion data history 232.

The tendency specification unit 163 is able to execute tendency specification processing of acquiring the emotion data of the user, which has been stored in the emotion data history 232 of the content server 200, via the terminal communication unit 110 and specifying a tendency of the change over time in the level of the emotion of the user on the basis of the emotion data. A specific example of the tendency specification processing will be described later with reference to (b) of FIG. 3.

The recommendation content search unit 164 is able to execute recommendation content search processing of searching for a recommendation content to be recommended to the user of the communication terminal 100 from among the content data 231 of the content server 200 on the basis of the emotion data input by the user with use of the input unit 120 and the tendency specified by the tendency specification unit 163. A specific example of the recommendation content search processing will be described later with reference to (c) of FIG. 3. Note that, the recommendation content searched by the recommendation content search unit 164 is able to be presented by the content presentation unit 161 in accordance with an instruction of the terminal control unit 160.

The content server 200 stores various kinds of content data in the content data 231 and is able to transmit the content data in response to a request from the communication terminal 100. Further, the content server 200 is able to receive, from the communication terminal 100, emotion data that is input while the user of the communication terminal 100 views a content and store the emotion data in the emotion data history 232.

The server communication unit 210 transmits and receives various kinds of data to and from the terminal communication unit 110 of the communication terminal 100 in accordance with an instruction of the server control unit 220. Specifically, the server communication unit 210 is able to transmit, to the terminal communication unit 110, specific content data acquired by the server control unit 220 from the content data 231. The server communication unit 210 is also able to transmit, to the server control unit 220, the emotion data received from the terminal communication unit 110.

The server control unit 220 controls the respective units of the content server 200 in an integral manner. The server control unit 220 is able to acquire specific content data from the content data 231 in response to a request received from the communication terminal 100 via the server communication unit 210 and transmit the specific content data to the communication terminal 100 via the server communication unit 210. When receiving the emotion data from the communication terminal 100 via the server communication unit 210, the server control unit 220 is able to additionally register the emotion data in the emotion data history 232. The server control unit 220 is able to transmit part or all of the emotion data history 232 to the communication terminal 100 via the server communication unit 210.

The server storage unit 230 stores various kinds of information handled by the content server 200 and the various kinds of data are read and written by the server control unit 220.

The content data 231 indicates a plurality of pieces of content data stored in the content server 200. A specific example of the content data 231 will be described later with reference to (a) and (b) of FIG. 4.

The emotion data history 232 stores the emotion data that is input while the user views the content and that is received from the communication terminal 100. The emotion data history 232 may store emotion data received from each of a plurality of communication terminals connected to the content server 200 in a communicable manner. In other words, the emotion data history 232 is able to store emotion data input by another user with use of a terminal other than the communication terminal 100. A specific example of the emotion data history 232 will be described later with reference to (a) and (b) of FIG. 4.

(Flow of Searching for Recommendation Content)

A flow of searching for a recommendation content with use of the content recommendation system 1 according to the present embodiment will be described with reference to each of (a) to (c) of FIG. 3. Portions (a) to (c) of FIG. 3 are schematic views each illustrating an example of a flow in which a recommendation content is searched on the basis of emotion data accumulated in the content server 200 in the content recommendation system 1. Portion (a) of FIG. 3 illustrates a flow in which the emotion data is input while a content is viewed in the communication terminal 100 and (b) of FIG. 3 illustrates a flow in which a tendency of the change over time in the level of the emotion of the user of the communication terminal 100 is specified on the basis of the emotion data history 232 after (a) of FIG. 3. Portion (c) of FIG. 3 illustrates a flow in which a recommendation content is specified on the basis of the tendency specified in (b) of FIG. 3, and output by the communication terminal 100.

In the following description, an identifier (user ID) of the user of the communication terminal 100 is defined as "A" to uniquely identify the user, and an identifier (content ID) of content data including a picture of a cat is defined as "1" to uniquely identify content data.

Portion (a) of FIG. 3 illustrates a case where content data including a picture of a cat is displayed on the display unit 130 of the communication terminal 100 and the user inputs the change over time in the level of his or her emotion while viewing the content data. A graph of the emotion data input by the user is indicated in a right side of the figure, in which an elapsed time (second) from when presentation of the content data starts is taken along a horizontal axis and the level (emotion intensity) of each of four emotions of "delight", "anger", "sorrow", and "pleasure", which is input by the user with respect to each of the emotions, is taken along a vertical axis. Here, the emotion intensity is a value indicating a level of each of the four emotions of "delight", "anger", "sorrow", and "pleasure", which is input by the user with use of the input field displayed on the display unit 130, and is input from 11 levels of 0 to 10. In the example illustrated in the figure, the graph of the emotion data is generated on the basis the emotion intensity that is input every 10 seconds and a time during which the content data is viewed is 90 seconds. That is, nine emotion intensities are input in the graph of the emotion data illustrated in the figure. Note that, description has been given with a case where the content data is displayed on the display unit 130, but in a case where the content data is, for example, data of only sound, only an input field may be displayed on the display unit 130 without displaying an image or a video related to the content data.

The user of the communication terminal 100 is able to generate the emotion data as in the graph illustrated in the figure by inputting the change over time in the level of his or her emotion while viewing the content data. Then, the generated emotion data is additionally registered in the emotion data history 232 of the content server 200 by the emotion data accumulation unit 162.

Portion (b) of FIG. 3 illustrates a flow in which a tendency of the change over time in the level of the emotion of the user of the communication terminal 100 is specified on the basis of the emotion data history 232 after (a) of FIG. 3. Note that, it is assumed that, by repeating the flow, which has been described with reference to (a) of FIG. 3, before (b) of FIG. 3, a plurality of pieces of emotion data input by the user of the communication terminal 100 are stored in the emotion data history 232. In (b) of FIG. 3, the tendency specification unit 163 specifies, from the emotion data history 232, the tendency of the change over time in the level of the emotion of the user on the basis of emotion data that is previously registered by the user of the communication terminal 100.

A specific example of a method of specifying a tendency of the change over time in the level of the emotion of the user will be described. As an example, the tendency specification unit 163 specifies the tendency on the basis of an average value of the level of the emotion based on a plurality of pieces of emotion data. First, the tendency specification unit 163 acquires, from the emotion data history 232, all histories of the emotion data that is previously registered by the user of the communication terminal 100. Next, the tendency specification unit 163 calculates, every predetermined time, an average value of each of the four emotions of "delight", "anger", "sorrow", and "pleasure" in the acquired histories. For example, the tendency specification unit 163 extracts values of the emotion intensity that are input to the input field of "delight" by the user in the plurality of histories and calculates an average value every elapsed time from when presentation of content data starts.

Thereby, the tendency specification unit 163 calculates an average value of values of the emotion intensity related to "delight" in the histories of the emotion data that has been stored by the user of the communication terminal 100. The tendency specification unit 163 also performs similar processing for three emotions of "anger", "sorrow", and "pleasure" and calculates an average value of values of the emotion intensity. The tendency specification unit 163 specifies a result, which is obtained by combining the average values of the values of the emotion intensity in "delight", "anger", "sorrow", and "pleasure", as emotion data corresponding to the tendency of the change over time in the level of the emotion of the user of the communication terminal 100.

Portion(c) of FIG. 3 illustrates a flow in which a recommendation content to be recommended to the user is searched from among the content data 231 of the content server 200 on the basis of the tendency specified in (b) of FIG. 3, and displayed on the display unit 130 of the communication terminal 100.

First, after the tendency of the change over time in the level of the emotion of the user is specified in (b) of FIG. 3, the recommendation content search unit 164 specifies, from among the emotion data history 232, emotion data which is most similar to the specified tendency. The recommendation content search unit 164 calculates, every elapsed time, an absolute value of a difference between the emotion data corresponding to the tendency and the emotion intensity of each of the four emotions of "delight", "anger", "sorrow", and "pleasure" in all the histories stored in the emotion data history 232. Then, a history in which an accumulated value obtained by accumulating absolute values of the difference calculated in the entire viewing time is smallest is able to be specified as the emotion data which is most similar to the tendency.

After that, the recommendation content search unit 164 acquires, from the content data 231, content data linked to the emotion data specified as the emotion data which is most similar to the tendency, and uses the content data as a recommendation content. Then, the content presentation unit 161 presents, by using the display unit 130, the recommendation content acquired by the recommendation content search unit 164.

In this manner, in the content recommendation system 1, a tendency of the user of the communication terminal 100 is able to be specified on the basis of emotion data input by the user and a recommendation content based on the specification is able to be presented to the user.

(Specific Example of Content Data and Emotion Data History)

Specific examples of the content data 231 and the emotion data history 232 that are included in the content server 200 in the present embodiment will be described with reference to (a) and (b) of FIG. 4. Portions (a) and (b) of FIG. 4 each illustrate a specific example of data stored in the content server 200, in which (a) of FIG. 4 illustrates an example of the content data 231 and (b) of FIG. 4 illustrates an example of the emotion data history 232.

Portion (a) of FIG. 4 illustrates a specific example of the content data 231. In the example illustrated in the figure, the content data 231 is constituted by a table format and three columns of "content ID", "genre", and "content" are defined. In the column of "content ID", an identifier (ID) to uniquely identify content data designated in the column of "content" is set, and in the column of "genre", a genre of the content data designated in the column of "content" is set.

For example, content data whose value of the column of "content ID" is "1" and value of the column of "genre" is "action" indicates a file of "Content1.mp4" indicated by the column of "content". Note that, contents set in the column of "content" may be information such as a file name or a storage place of the content data or content data itself.

Portion (b) of FIG. 4 illustrates a specific example of the emotion data history 232. In the example illustrated in the figure, the emotion data history 232 is constituted by a table format, and includes three columns of "user ID", "content ID", and "elapsed time" and items of "emotion data" constituted by four columns of "delight", "anger", "sorrow", and "pleasure".

In the column of "user ID", an identifier (ID) to uniquely identify the user of the communication terminal 100 is set, and in the column of "content ID", similar contents to those of the column of "content ID" in the content data 231 illustrated in (a) of FIG. 4 are set. That is, the content data 231 and the emotion data history 232 are linked to each other by the column of "content ID". The column of "elapsed time" indicates an elapsed time from when presentation of content data having the ID set to the column of "content ID" starts.

In the example illustrated in the figure, setting in the column of "elapsed time" is every 10 seconds and this indicates that emotion data is input in the communication terminal 100 every 10 seconds. In the four columns of "delight", "anger", "sorrow", and "pleasure" of "emotion data", the emotion intensity of each of the emotions input by the user is set. That is, according to the graph of the emotion data illustrated in (b) of FIG. 3, a value of "0" to "10" is set to each of the four columns of "delight", "anger", "sorrow", and "pleasure".

The content recommendation system 1 according to the present embodiment is able to specify a tendency of the user by using the content data 231 and the emotion data history 232 and present a recommendation content based on the specification to the user.

(Flow of Processing)

A flow of processing executed by the communication terminal 100 according to the present embodiment will be described with reference to FIG. 5. FIG. 5 is a flowchart illustrating an example of a flow of processing executed by the communication terminal 100.

First, the terminal control unit 160 of the communication terminal 100 logs in to the content server 200 (S1). Next, the terminal control unit 160 acquires content data from the content data 231 of the content server 200 in accordance with an input of the user to the input unit 120. The content presentation unit 161 outputs the acquired content data from the display unit 130 and the speaker 140 (S2: content presentation step).

After S2, the terminal control unit 160 determines whether or not emotion data is input by the user with use of the input unit 120 while a content is output (S3). When it is determined that emotion data is not input (NO at S3), a sequence of processing ends. On the other hand, when it is determined that emotion data is input (YES at S3), the emotion data accumulation unit 162 transmits the emotion data input at S3 to the content sever 200 by linking the emotion data to the content output at S2, and stores the emotion data in the emotion data history 232 (S4: emotion data accumulation step).

After S4, the tendency specification unit 163 specifies a tendency of the change over time in the level of the emotion of the user by the method as described above with reference to (b) of FIG. 3 (S5: tendency specification step). After that, the recommendation content search unit 164 extracts, from the emotion data history 232, emotion data which is most similar to the tendency specified at S5, and specifies, as a recommendation content, a content linked to the emotion data (S6: recommendation content search step).

After S6, the terminal control unit 160 determines whether a recommendation content exists (S7). When it is determined that a recommendation content does not exist (NO at S7), a sequence of processing ends. On the other hand, when it is determined that a recommendation content exists (YES at S7), the terminal control unit 160 acquires the recommendation content from the content server 200 and the content presentation unit 161 outputs the acquired content from the display unit 130 and the speaker 140 (S8).

With the foregoing processing, the communication terminal 100 according to the present embodiment is able to recommend a new content which follows a tendency of the change over time in the level of the emotion of the user, the tendency being specified by using emotion data input by the user while a content is displayed. Thereby, for example, a new content that brings, to the user, a change over time similar to the tendency of the change over time in the level of the emotion while the user views a content is able to be recommended to the user. Thus, an effect is exerted that a communication terminal that recommends an appropriate content on the basis of the change over time in the level of the emotion of the user is able to be provided.

Embodiment 2

Embodiment 2 of the disclosure will be described below with reference to FIGS. 1, 6A to 6C, and 7. Note that, for convenience of description, a member having the same function as that of the member described in the embodiment described above will be given the same reference sign and description thereof will not be repeated.

(Configuration of Content Recommendation System)

A configuration of the content recommendation system 1 according to the present embodiment will be described with reference to FIG. 1. The content recommendation system 1 and that of Embodiment 1 described above are the same in a basic configuration, but are different in a part of a configuration. In the present embodiment, at timing when content data is not presented, the communication terminal 100 allows an input of a current emotion of the user and his or her desired emotion after viewing of the content data. Further, on the basis of information about the emotion that is input and emotion data that is previously input by the user, the communication terminal 100 is able to specify a tendency of the change over time in the level of the emotion of the user to recommend a new content to the user.

The communication terminal 100 and that of Embodiment 1 described above are the same in a basic configuration, but are different in part of a configuration of the tendency specification unit 163. At timing when the content presentation unit 161 does not present content data by using the display unit 130, the tendency specification unit 163 allows the user to input his or her current emotion and his or her desired emotion after viewing of content data. Then, the tendency specification unit 163 specifies a tendency of the change over time in the emotion of the user on the basis of the information about the emotion that is input and a plurality of pieces of emotion data of the user that have been stored in the emotion data history 232 and that are acquired from the content server 200 via the terminal communication unit 110. A method of specifying the tendency will be described later with reference to (a) to (c) of FIG. 6.

(Flow in which Tendency is Specified on the Basis of Information about Desired Emotion)

A flow which is executed by the content recommendation system 1 according to the present embodiment and in which a tendency of the change over time in the level of the emotion of the user of the communication terminal 100 is specified will be described with reference to each of (a) to (c) of FIG. 6. The specification of a tendency is performed on the basis of a current emotion of the user of the communication terminal 100 and his or her desired emotion after viewing of content data, which are input by the user. Portions (a) to (c) of FIG. 6 are schematic views each illustrating a flow in which a tendency of the change over time in the level of the emotion of the user is specified on the basis of a current emotion of the user and his or her desired emotion after viewing of content data in the content recommendation system 1. Portion (a) of FIG. 6 illustrates a situation in which the user of the communication terminal 100 inputs his or her current emotion and his or her desired emotion after viewing of content data and (b) of FIG. 6 illustrates a flow in which a tendency of the change over time in the level of the emotion of the user is specified on the basis of contents that are input in (a) of FIG. 6. Portion (c) of FIG. 6 illustrates a flow in which a recommendation content is specified on the basis of the tendency specified in (b) of FIG. 6, and is output by the communication terminal 100.

Portion (a) of FIG. 6 illustrates a state where content data is not output to the communication terminal 100 and only an input of emotion data with use of the input field is allowed. By using the input field, the user of the communication terminal 100 is able to input his or her current emotion and his or her desired emotion after viewing of content data. As an example, the content presentation unit 161 causes the display unit 130 to display an image that prompts an input of a current emotion of the user and a UI (so-called input completion button) that allows the user to perform an input indicating completion of the input. That is, the user inputs his or her current emotion to the input field and inputs a given operation (for example, tap operation) to the UI. Thereby, the tendency specification unit 163 acquires information about the current emotion of the user. In this example, being triggered by the input of the given operation to the UI, the content presentation unit 161 turns off the display of the image that prompts input of a current emotion of the user, and displays, on the display unit 130, an image that prompts an input of a desired emotion after viewing of content data. The user inputs his or her desired emotion after viewing of content data to the input field and inputs the given operation to the UI. Thereby, the tendency specification unit 163 acquires information about the desired emotion of the user after viewing of content data.

Portion (b) of FIG. 6 illustrates a flow in which, when the user of the communication terminal 100 inputs his or her current emotion and his or her desired emotion after viewing of content data in (a) of FIG. 6, the tendency specification unit 163 specifies a tendency of the change over time in the level of the emotion of the user on the basis of input contents.

A specific example of a method of specifying a tendency of the change over time in the level of the emotion of the user will be described. First, the tendency specification unit 163 acquires, from the emotion data history 232, all histories of emotion data that is previously registered by the user of the communication terminal 100. Next, the tendency specification unit 163 extracts, from the histories, a history in which an absolute value of a difference between an emotion when viewing of content data starts and a current emotion of the user is a predetermined value or less and an absolute value of a difference between an emotion when the viewing ends and a desired emotion of the user after the viewing is a predetermined value or less. After that, the tendency specification unit 163 calculates, every predetermined time, the average values of the four emotions of "delight", "anger", "sorrow", and "pleasure" in the extracted history, as described above in (b) of FIG. 3. The tendency specification unit 163 specifies a result, which is obtained by combining the average values of the values of the emotion intensity in "delight", "anger", "sorrow", and "pleasure", as emotion data corresponding to the tendency of the change over time in the level of the emotion of the user of the communication terminal 100.

Portion (c) of FIG. 6 illustrates a flow in which a recommendation content to be recommended to the user is searched from the content data 231 of the content server 200 on the basis of the tendency specified in (b) of FIG. 6, and displayed on the display unit 130 of the communication terminal 100. Note that, in (c) of FIG. 6, the recommendation content search unit 164 specifies the recommendation content by the method described above with reference to (c) of FIG. 3. Then, the content presentation unit 161 presents the recommendation content acquired by the recommendation content search unit 164 by using the display unit 130.

In this manner, the content recommendation system 1 according to the present embodiment is able to specify a tendency on the basis of information which is input by the user of the communication terminal 100 and relates to a desired emotion of the user after viewing, and present a recommendation content on the basis of the tendency.

(Flow of Processing)

A flow of processing executed by the communication terminal 100 according to the present embodiment will be described with reference to FIG. 7. FIG. 7 is a flowchart illustrating an example of the flow of the processing executed by the communication terminal 100.

First, in a similar manner to Embodiment 1 described above, the terminal control unit 160 of the communication terminal 100 logs in to the content server 200 (S1). Next, the terminal control unit 160 determines whether or not a current emotion and a desired content after viewing of a content are input by the user via the input unit 120 (S21). When determining that the emotions are input (YES at S21), the terminal control unit 160 specifies a tendency of the change over time in the level of the emotion of the user by the method as described with reference to FIG. 6 (S22: tendency specification step). After that, the procedure proceeds to S6. Processing of S6 to S8 is the same as that in Embodiment 1 described above.

With the foregoing processing, the communication terminal 100 according to the present embodiment is able to recommend a content according to a tendency specified on the basis of a current emotion of the user and his or her desired emotion after viewing. Thereby, for example, the user is able to receive, in accordance with his or her past emotion data, recommendation of a content that easily brings his or her desired emotion after viewing. Note that, the communication terminal 100 is configured to receive both a current emotion of the user and his or her desired emotion after viewing in the foregoing description, but may be configured to receive an input of only one of them. In other words, the communication terminal 100 may specify a tendency of the change over time in the emotion of the user in accordance with only information input by the user on the basis of the current emotion of the user. Similarly, the communication terminal 100 may specify a tendency of the change over time in the emotion of the user in accordance with only information input by the user on the basis of his or her desired emotion after viewing of a content.

Embodiment 3

The content recommendation system 1 according to the present embodiment will be described with reference to FIGS. 1 to 4B. The content recommendation system 1 and that of each of the embodiments described above are the same in a basic configuration, but are different in that emotion data that is input by the user of the communication terminal 100 and stored last by the emotion data accumulation unit 162 in the emotion data history 232 is used as a tendency of the change over time in the emotion of the user. In other words, in the present embodiment, the tendency specification unit 163 specifies emotion data, which is stored last by the emotion data accumulation unit 162 in the emotion data history 232, as a tendency of the change over time in the emotion of the user of the communication terminal 100. Note that, in a similar manner to each of the embodiments described above, the recommendation content search unit 164 is able to specify, as a recommendation content, content data that is linked to emotion data which is most similar to the tendency specified by the tendency specification unit 163.

Thereby, the content recommendation system 1 according to the present embodiment is able to recommend a new content on the basis of emotion data input in accordance with a content which is most recently viewed by the user of the communication terminal 100. Note that, emotion data that is specified by the tendency specification unit 163 as a tendency of the change over time in the emotion of the user may not be emotion data stored last by the emotion data accumulation unit 162 in the emotion data history 232. Specifically, the emotion data specified by the tendency specification unit 163 as a tendency of the change over time in the emotion of the user may be any emotion data stored in the emotion data history 232.

Modified Example

In Embodiments 1 and 2 described above, the tendency specification unit 163 is configured to specify a result, which is obtained by combining average values of values of the emotion intensity in "delight", "anger", "sorrow", and "pleasure", as a tendency of the change over time in the level of the emotion of the user of the communication terminal 100. However, a method of specifying the tendency is not limited thereto. For example, the tendency specification unit 163 according to the present modified example is different in terms of specifying a tendency of the change over time in the level of the emotion of the user in accordance with a genre.

As for a tendency of the change over time in the level of the emotion of the user, the communication terminal 100 acquires, from the emotion data history 232, histories of a plurality of pieces of emotion data related to a genre which is the same as that of content data which is most recently viewed by the user. Then, an average value of each of the four emotions of "delight", "anger", "sorrow", and "pleasure" in the acquired histories is calculated every predetermined time and the resultant is specified as a tendency of the change over time in the level of the emotion of the user. Thereby, the tendency of the user is able to be specified in accordance with the genre and a recommendation content is able to be searched on the basis of the specified tendency.

In Embodiments 1 and 2 described above, the tendency specification unit 163 is configured to calculate, every predetermined time, an average value of each of the four emotions of "delight", "anger", "sorrow", and "pleasure" in histories acquired from the emotion data history 232. However, a playback time of content data is not necessarily fixed and the average value calculated every predetermined time may not be appropriate as a tendency of the change over time in the level of the emotion of the user. For example, in a case where a plurality of histories include a specific history linked to specific content data whose playback time is extremely long, an average value corresponding to a last half part of the playback time may be obtained by referring to only a value of the specific history. Thus, for example, the tendency specification unit 163 may calculate the average value in accordance with a ratio of an elapsed time to an entire playback time of content data. The tendency specification unit 163 may be configured to calculate the average value, for example, every time the ratio of the elapsed time is increased by 10%.

In Embodiments 1 and 2 described above, the tendency specification unit 163 is configured to calculate an average value of the level of the emotion based on a plurality of pieces of emotion data and specify a tendency of the change over time in the level of the emotion. However, a method of specifying the tendency is not limited to an example of calculating an average value. For example, the tendency specification unit 163 may calculate the tendency by calculation using an existing method.

FIG. 8 illustrates another modified example of the disclosure. FIG. 8 is a block diagram illustrating an example of a configuration of a principal part of the content recommendation system 1 according to the modified example.

Though each of the embodiments described above provides a configuration in which accumulation of emotion data, specification of a tendency of the change over time in the level of the emotion of the user, and specification of content data to be recommended to the user are performed in the communication terminal 100, such processing is executed in the content server 200 in the modified example. That is, instead of the emotion data accumulation unit 162, the tendency specification unit 163, and the recommendation content search unit 164 of the communication terminal 100 in FIG. 1, the server control unit 220 includes an emotion data accumulation unit 221, a tendency specification unit 222, and a recommendation content search unit 223. The communication terminal 100 may not include the content presentation unit 161, but instead, the server control unit 220 may be configured to execute content presentation processing that provides a content to the communication terminal 100.

Further, the respective functions performed in the content recommendation system 1 may be allocated to the communication terminal 100 and the content server 200 in any manner. For example, a configuration in which the communication terminal 100 includes the content presentation unit 161, the emotion data accumulation unit 162, and the tendency specification unit 163 and the content server 200 includes the recommendation content search unit 223 may be provided.

[Implementation Example by Software]

A control block (particularly, the tendency specification unit 163 or the recommendation content search unit 164) of the communication terminal 100 may be implemented by a logic circuit (hardware) formed in an integrated circuit (IC chip) or the like or may be implemented by software.

In the latter case, the communication terminal 100 includes a computer that executes a command of a program that is software implementing each of the functions. For example, the computer includes at least one processor (control device) and includes at least one computer readable recording medium having the program stored therein. The disclosure is provided when the processor reads and executes the program from the recording medium in the computer. As the processor, for example, a CPU (Central Processing Unit) is able to be used. As the recording medium, in addition to a "non-transitory tangible medium", for example, such as a ROM (Read Only Memory), a tape, a disk, a card, a semiconductor memory, or a programmable logic circuit is able to be used. Further, a RAM (Random Access Memory) in which the program is loaded, or the like may be further included. Moreover, the program may be supplied to the computer via any transmission medium (such as a communication network or a broadcast wave) which allows the program to be transmitted. Note that, an aspect of the disclosure can also be implemented in a form of a data signal in which the program is embodied through electronic transmission and which is embedded in a carrier wave.

CONCLUSION

A communication terminal according to an aspect 1 of the disclosure is a communication terminal including at least one playback device, at least one input device, at least one communication device, and at least one control device, in which the control device performs content presentation processing of acquiring a content from a content server via the communication device and playing back the content by the playback device, emotion data storage processing of storing, in the content server via the communication device, at least a piece of emotion data that is input from the input device and that is a change over time in a level of an emotion of a user of the communication terminal, which is caused by viewing the content played back by the playback device, tendency specification processing of acquiring the emotion data of the user, which has been stored in the content server, from the content server via the communication device and specifying a tendency of the change over time of the user on a basis of the emotion data, and recommendation content search processing of searching for a recommendation content to be recommended to the user on a basis of the emotion data and the tendency.

According to the aforementioned configuration, the communication terminal is able to recommend a new content which follows a tendency of the change over time in the level of the emotion of the user, the tendency being specified on the basis of emotion data input by the user while a content is played back. Thereby, for example, a new content that brings, to the user, a change over time similar to the tendency of the change over time in the level of the emotion while the user views a content is able to be recommended to the user. Thus, an effect is exerted that a communication terminal that recommends an appropriate content on the basis of the change over time in the level of the emotion of the user is able to be provided.

The communication terminal according to an aspect 2 of the disclosure may have a configuration in which in the tendency specification processing, the tendency is specified on a basis of an average value of the level of the emotion based on the plurality of pieces of emotion data of the user, which have been stored in the content server, in the aspect 1. According to the aforementioned configuration, the communication terminal is able to specify a tendency of a content viewed by the user on the basis of an average value of past emotion data that is previously input by the user and recommend a new content according to the tendency.

The communication terminal according to an aspect 3 of the disclosure may have a configuration in which in the tendency specification processing, the tendency is specified on a basis of information that is input by the user to the input device and relates to a current emotion of the user, and the plurality of pieces of emotion data of the user, which have been stored in the content server, in any of the aspects 1 and 2.

According to the aforementioned configuration, the communication terminal is able to recommend a content according to the tendency specified in accordance with the current emotion of the user. Thereby, the user is able to receive recommendation of a content, which tends to be often viewed when the user has an emotion similar to his or her current emotion, on the basis of his or her past emotion data, for example.

The communication terminal according to an aspect 4 of the disclosure may have a configuration in which in the tendency specification processing, the tendency is specified on a basis of information that is input by the user to the input device and relates to a desired emotion of the user after viewing, and the plurality of pieces of emotion data of the user, which have been stored in the content server and are acquired from the content server via the communication device, in any of the aspects 1 to 3.

According to the aforementioned configuration, the communication terminal is able to recommend a content according to the tendency specified in accordance with the desired emotion of the user after viewing. Thereby, for example, the user is able to receive, in accordance with his or her past emotion data, recommendation of a content that easily brings his or her desired emotion after viewing.

The communication terminal according to an aspect 5 of the disclosure may have a configuration in which in the tendency specification processing, the tendency is specified on a basis of the emotion data of the user, which is stored last in the content server in the emotion data storage processing, in the aspect 1. According to the aforementioned configuration, the communication terminal is able to recommend a new content on the basis of emotion data input in accordance with a content that is viewed last by the user.

The communication terminal according to an aspect 6 of the disclosure may have a configuration in which in the recommendation content search processing, among contents linked to emotion data of another user, a content linked to emotion data which is most similar to the tendency of the user is used as the recommendation content, in any of the aspects 1 to 5. According to the aforementioned configuration, the communication terminal is able to recommend, to the user, the content linked to the emotion data which is most similar to the tendency of the content viewed by the user.

A content server according to an aspect 7 of the disclosure is a content server including at least one storage device and at least one control device, in which the control device performs content presentation processing of providing a content to a communication terminal, emotion data storage processing of receiving, from the communication terminal, at least a piece of emotion data that is input by a user of the communication terminal and that is a change over time in a level of an emotion, which is caused when the user views the content, and storing the emotion data in the storage device, tendency specification processing of specifying a tendency of the change over time of the user on a basis of the emotion data of the user, which has been stored in the storage device, and recommendation content search processing of searching the storage device for a recommendation content to be recommended to the user on a basis of the tendency.

According to the aforementioned configuration, the content server is able to specify a tendency of the change over time in the level of the emotion of the user on the basis of emotion data input by the user in accordance with a content provided to the communication terminal, and search for a recommendation content on the basis of the tendency. Thereby, for example, a new content that brings, to the user, a change over time similar to the tendency of the change over time in the level of the emotion while the user views a content is able to be recommended to the user. Thus, an effect is exerted that a content server that recommends an appropriate content on the basis of the change over time in the level of the emotion of the user is able to be provided.

A content recommendation system according to an aspect 8, which includes the communication terminal and a content server and in which the content server stores emotion data of a plurality of users, may have a configuration in which the communication terminal according to the aspect 1 and a content server are provided and the content server stores emotion data of a plurality of users. According to the aforementioned configuration, a similar action effect to that of any of the aspects 1 to 6 is exerted.

A control method according to an aspect 9 of the disclosure is a control method of a communication terminal including at least one playback device, at least one input device, at least one communication device, and at least one control device, and the control method includes: acquiring a content from a content server via the communication device and playing back the content by the playback device; storing, in the content server via the communication device, at least a piece of emotion data that is input from the input device and that is a change over time in a level of an emotion of a user of the communication terminal, which is caused by viewing the content played back by the playback device; acquiring the emotion data of the user, which has been stored in the content server, from the content server via the communication device and specifying a tendency of the change over time of the user on a basis of the emotion data; and searching for a recommendation content to be recommended to the user on a basis of the emotion data and the tendency. According to the aforementioned configuration, a similar action effect to that of the aspect 1 is exerted.

A control device according to an aspect 10 of the disclosure is a control device that controls a communication terminal, and the control device includes: a content presentation unit that acquires a content from a content server via a communication device and plays back the content by a playback device; an emotion data accumulation unit that stores, in the content server via the communication device, at least a piece of emotion data that is a change over time in a level of an emotion of a user of the communication terminal, which is caused by viewing the content played back by the playback device; a tendency specification unit that acquires the emotion data of the user, which has been stored in the content server, from the content server via the communication device and specifies a tendency of the change over time of the user on a basis of the emotion data; and a recommendation content search unit that searches for a recommendation content to be recommended to the user on a basis of the emotion data and the tendency. According to the aforementioned configuration, a similar action effect to that of the aspect 1 is exerted.

The communication terminal 100 and the content server 200 according to each of the embodiments of the disclosure may be implemented by a computer. In this case, a control program of the communication terminal 100 and the content server 200, which causes the computer to operate as each unit (software element) included in the communication terminal 100 and the content server 200 to thereby implement the communication terminal 100 and the content server 200 in the computer, and a computer readable recording medium storing the control program are also included in a scope of the disclosure.

The disclosure is not limited to each of the embodiments described above, and may be modified in various manners within the scope indicated in the claims and an embodiment achieved by appropriately combining techniques disclosed in each of different embodiments is also encompassed in the technical scope of the disclosure. Further, by combining the techniques disclosed in each of the embodiments, a new technical feature may be formed.

The present disclosure contains subject matter related to that disclosed in Japanese Priority Patent Application JP 2018-127756 filed in the Japan Patent Office on Jul. 4, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal comprising at least one playback device, at least one input device, at least one communication device, and at least one control device, wherein the control device comprising a processor that performs content presentation processing of acquiring a content from a content server via the communication device and playing back the content by the playback device, emotion data storage processing of storing, in the content server via the communication device, at least a piece of emotion data that is input from the input device and that is a change over time in a level of an emotion of a user of the communication terminal, which is caused by viewing the content played back by the playback device, tendency specification processing of acquiring the emotion data of the user, which has been stored in the content server, from the content server via the communication device and specifying a tendency of the change over time of the user on a basis of the emotion data, and recommendation content search processing of searching for a recommendation content to be recommended to the user on a basis of the emotion data and the tendency; and in the tendency specification processing, the tendency is specified on a basis of information that is input by the user to the input device and relates to a desired emotion of the user after viewing, and the plurality of pieces of emotion data of the user, which have been stored in the content server and are acquired from the content server via the communication device.

2. The communication terminal according to claim 1, wherein in the tendency specification processing, the tendency is specified on a basis of an average value of the level of the emotion based on the plurality of pieces of emotion data of the user, which have been stored in the content server.

3. The communication terminal according to claim 1, wherein in the tendency specification processing, the tendency is specified on a basis of information that is input by the user to the input device and relates to a current emotion of the user, and the plurality of pieces of emotion data of the user, which have been stored in the content server.

4. The communication terminal according to claim 1, wherein in the tendency specification processing, the tendency is specified on a basis of the emotion data of the user, which is stored last in the content server in the emotion data storage processing.

5. The communication terminal according to claim 1, wherein in the recommendation content search processing, among contents linked to emotion data of another user, a content linked to emotion data which is most similar to the tendency of the user is used as the recommendation content.

6. A content server comprising at least one storage device and at least one control device, wherein the control device comprising a processor that performs content presentation processing of providing a content to a communication terminal, emotion data storage processing of receiving, from the communication terminal, at least a piece of emotion data that is input by a user of the communication terminal and that is a change over time in a level of an emotion, which is caused when the user views the content, and storing the emotion data in the storage device, tendency specification processing of specifying a tendency of the change over time of the user on a basis of the emotion data of the user, which has been stored in the storage device, and recommendation content search processing of searching the storage device for a recommendation content to be recommended to the user on a basis of the tendency; and in the tendency specification processing, the tendency is specified on a basis of information that is input by the user to the communication terminal and relates to a desired emotion of the user after viewing, and the plurality of pieces of emotion data of the user, which have been stored in the content server and are received from the communication terminal.

7. A content recommendation system comprising:

a communication terminal comprising at least one playback device, at least one input device, at least one communication device, and at least one control device, wherein the control device comprising a processor that performs content presentation processing of acquiring a content from a content server via the communication device and playing back the content by the playback device, emotion data storage processing of storing, in the content server via the communication device, at least a piece of emotion data that is input from the input device and that is a change over time in a level of an emotion of a user of the communication terminal, which is caused by viewing the content played back by the playback device, tendency specification processing of acquiring the emotion data of the user, which has been stored in the content server, from the content server via the communication device and specifying a tendency of the change over time of the user on a basis of the emotion data, and recommendation content search processing of searching for a recommendation content to be recommended to the user on a basis of the emotion data and the tendency; and in the tendency specification processing, the tendency is specified on a basis of information that is input by the user to the input device and relates to a desired emotion of the user after viewing, and the plurality of pieces of emotion data of the user, which have been stored in the content server and are acquired from the content server via the communication device; and the content server, wherein the content server stores emotion data of a plurality of users.

8. A control method of a communication terminal including at least one playback device, at least one input device, at least one communication device, and at least one control device, the control method comprising:

acquiring a content from a content server via the communication device and playing back the content by the playback device;

storing, in the content server via the communication device, at least a piece of emotion data that is input from the input device and that is a change over time in a level of an emotion of a user of the communication terminal, which is caused by viewing the content played back by the playback device;

acquiring the emotion data of the user, which has been stored in the content server, from the content server via the communication device and specifying a tendency of the change over time of the user on a basis of the emotion data; and searching for a recommendation content to be recommended to the user on a basis of the emotion data and the tendency; wherein in the tendency specification processing, the tendency is specified on a basis of information that is input by the user to the input device and relates to a desired emotion of the user after viewing, and the plurality of pieces of emotion data of the user, which have been stored in the content server and are acquired from the content server via the communication device.

9. A control device comprising a processor coupled to a storage device that controls a communication terminal, the control device comprising:

a content presentation unit that acquires a content from a content server via a communication device and plays back the content by a playback device;

an emotion data accumulation unit that stores, in the content server via the communication device, at least a piece of emotion data that is a change over time in a level of an emotion of a user of the communication terminal, which is caused by viewing the content played back by the playback device;

a tendency specification unit that acquires the emotion data of the user, which has been stored in the content server, from the content server via the communication device and specifies a tendency of the change over time of the user on a basis of the emotion data; and a recommendation content search unit that searches for a recommendation content to be recommended to the user on a basis of the emotion data and the tendency; wherein in the tendency specification processing, the tendency is specified on a basis of information that is input by the user to the communication terminal and relates to a desired emotion of the user after viewing, and the plurality of pieces of emotion data of the user, which have been stored in the content server and are acquired from the content server via the communication device.

* * * * *